United States Patent [19]

Suyderhoud et al.

[11] 4,021,623
[45] May 3, 1977

[54] AUTOMATIC H-REGISTER CLEAR FOR PREVENTION OF ERRONEOUS CONVOLUTION IN DIGITAL ADAPTIVE ECHO CANCELLER

[75] Inventors: Henri G. Suyderhoud, Potomac; Michael Onufry, Jr., Brookeville; Eric R. Kauffman, Walkersville, all of Md.

[73] Assignee: Communications Satellite Corporation (Comsat), Washington, D.C.

[22] Filed: Oct. 23, 1975

[21] Appl. No.: 625,354

[52] U.S. Cl. .......................................... 179/170.2
[51] Int. Cl.² .......................................... H04B 3/20
[58] Field of Search .......... 179/170.2, 170.6, 170.8

[56] References Cited
UNITED STATES PATENTS

| 3,789,165 | 1/1974 | Campanella et al. | 179/170.2 |
| 3,836,734 | 9/1974 | Campanella et al. | 179/170.2 |
| 3,894,200 | 7/1975 | Campanella et al. | 179/170.2 |

Primary Examiner—William C. Cooper
Assistant Examiner—Randall P. Myers
Attorney, Agent, or Firm—Sughrue, Rothwell, Mion, Zinn & Macpeak

[57] ABSTRACT

An automatic H-register clear system for the prevention of erroneous convolution in adaptive digital echo cancellers is disclosed. Incoming signals from the H-register are accumulated and compared to a predetermined threshold value and when the value is exceeded, the H-register is cleared with the occurrence of the internal housekeeping cycle of the echo canceller. The clearing of the H-register allows a new impulse response model to be generated from new sampled data. In one embodiment using analog implementation, the accumulation takes place using a sequence of signal processing of digital-to-analog conversion, full wave rectification followed by integration of the signal. In another preferred embodiment using a counter detection system, each word is compared to a threshold and if this value is exceeded, a counter is indexed. If the value of the count in the counter exceeds a predetermined number during the sampling interval, the H-register is cleared. In this latter embodiment, either analog or digital implementation can be used.

8 Claims, 4 Drawing Figures

AUTOMATIC H-REGISTER CLEAR FOR PREVENTION OF ERRONEOUS CONVOLUTION IN DIGITAL ADAPTIVE ECHO CANCELLER

BACKGROUND OF THE INVENTION

1. Field of the Invention

This invention relates to an echo canceller operating on the principal of digital convolution.

2. Prior Art

This invention relates to the effective cancellation of echoes in two-way communication circuits of extremely long length such as circuits completed by way of orbiting satellites or undersea submarine cables. It is well known that hybrid circuits containing two-wire to four-wire circuits do not provide echo free coupling between the receive and send lines of the four-wire circuit. A portion of the signal, typically voice signals on the receive line, will pass to the send line and appear as an echo signal. Because, in long line communications, the signals require a finite travel time, this reflected energy or echo is heard sometime after the speech is transmitted. As distances increase, in the case of satellite communications to tens of thousands of miles, the echo takes longer to reach the talker and becomes more annoying.

Voice operated echo suppressors are commonly used for removing the echo caused by the imperfection in the hybrid or other echo path. The suppressor operates to interrupt the send line whenever a voice level signal is detected on the receive line. This eliminates echo but, at the same time, eliminates some voice signals emanating from the local two-wire circuit resulting in a clipping of the outgoing conversation. The problems of echo suppressors in terms of clipping conversations has led to a new class of devices which substantially eliminate echo returns without impeding the free flow of conversation in both directions.

This new class of devices for handling echo problems are known as echo cancellers. An echo canceller does not interrupt the send line but generates an approximation, $\hat{y}(t)$, of the echo $y(t)$ and subtracts the former from the signal appearing on the send line. The remaining signal on the send line during double talk is, $S(t) + e(t)$ where $S(t)$ is the local voice signal and $e(t)$ is the residual error caused by $\hat{y}(t)$ not being exactly equal to $y(t)$.

In general, echo cancellers operate on the assumption that the echo path may be regarded as a filter wherein the relationship:

$$y(t) = \int_0^\infty f(t-\tau) k(\tau) d\tau ,$$

is satisfied; where $f(t)$ is the signal applied to the echo path, $k(\tau)$ is the impulse response of the echo path, and $y(t)$ is the echo. Within the prior art, several solutions have been proposed which satisfy this relationship.

In Kelly et al, U.S. Pat. No. 3,500,000, a system is disclosed that automatically tracks variations in the echo path arising during conversation, for example, as additional circuits are connected or disconnected. The closed loop error control system of the latter patent includes an echo canceller which synthesizes a linear approximation of the echo transmission paths by means of a transversal filter. In a conventional manner, the filter comprises a delay line having a number of taps spaced along its length and develops a number of delayed replicas of the applied signal, each of which is independently adjusted in gain and polarity. The adjusted signals are then algebraically combined and then subtracted from signals in the outgoing circuit. The basic theory of operation and proof of a convergence of the closed loop canceller as set forth in the Kelly et al patent is based on the linear treatment of a plurality of delayed signals, $x_i(t)$ adjusted in gain by a series of functions $g_i(t)$. Although the system achieves cancellation at workable levels, the structure is relatively costly to manufacture, primarily because of the tapped delay line, and is relatively large.

In Sondhi, U.S. Pat. No. 3,499,999, an improvement on the Kelly et al (U.S. Pat. No. 3,500,000) device is disclosed. The system described in Sondhi utilizes generalized filter networks in place of a tapped delay line system to obtain suitable convergence and effective suppression in a closed loop system. This patent is directed specifically to a closed loop echo canceller in which replicas of the echo signal reaching the return path of a two-wire to four-wire network junction are developed by passing incoming signals through a plurality of generalized filter networks to produce a number of linear transformations of the input signal. These transformations are then selectively adjusted in gain under control of a differential outgoing signal in a manner taught by the prior patent to Kelly et al.

In another implementation of adaptive echo cancellation devices known in the prior art, an X memory stores digitized samples of the incoming signal $X(t)$ over a period T and an H-register stores a digital representation of the impulse response of the echo path. The H-register, a multi-stage register, containing the sampled form of the model of the echo path impulse response has its contents adaptively updated. The updating information for the H-register is obtained by implementation of an algorithm based on cross-correlating the receive side signal and the resulting echo signal from the echo path. In this form of implementation, both the X memory and the H-register recirculate, but the oldest sample in the X memory is replaced each sample period by a new sample of the signal $X(t)$. Digital convolution is performed on the contents of the two memories, that is, the contents are multiplied sample-by-sample, and the products summed resulting in an approximation of $\hat{y}(t)$ of the echo.

In one case, the impulse response of the echo path is stored in the H memory by using the search or interrogating pulse technique. In this system, after the circuit is complete between caller and called stations, but before the conversation begins, an artificial search by interrogating pulse is applied to the receive line. The pulse passes through the echo path and the resultant signal on the send line is the impulse response of the echo path. The impulse response is sampled over a period T, digitized and stored in the H-register. This general technique is discussed in Flanagan et al, U.S. Pat. No. 3,535,473. For a number of reasons, however, including the fact that the impulse response of the echo path will not be constant, the search pulse technique is not satisfactory. More recent cancellers continuously compute an impulse response that minimizes the mean squared error between $y(t)$ and $\hat{y}(t)$. The active circuitry includes an adaptive control loop, responsive to the residual error, $e(t)$ and the receive side signal $x(t)$ for implementing the steepest descent technique by adjusting the N samples of the H memory through incrementing or decrementing each sample by a given amount. When convergence is reached, i.e., the attainment of minimum error or echo, the contents of the H memory represent in digital form the impulse response of the echo path.

However, as is well known, when the echo signal is contaminated by other signals not originally present in the receive side of the echo canceller but, rather originating somewhere within the echo path, cross-correlation of such a contaminated signal results in erroneous information being stored in the H-register. The occurrence of contamination is unavoidable since it may consist of near-end speech which must be transmitted to the distant party. One method known within the prior art is to disable the updating process when the near-end speech is present. This near-end speech may represent contamination for the adaptive process. There is, however, a time constant involved in the disabling action which may, due to fast processing, allow erroneous information to be stored in the H-register. A second way that erroneous information enters the H-register is during the presence of high-level signals such as signalling tones, simultaneously present at receive and send sides of the canceller. Present cancellers remove the build-up and storage of erroneous information in the H-register after several seconds of receive speech and echo signals. The result, however, is the possibility of a spurt of audible echo for the distant talker.

The present invention prevents this from happening by zeroing all the contents of the H-register during one sampling interval upon detecting the erroneous information. The sampling interval is typically in the order of 125 microseconds. After the clearing action has occurred, the build-up of proper H-register information takes place within a fraction of a second and no noticable echo occurs.

SUMMARY OF THE INVENTION

In the present invention, the impulse response model of the echo path is stored in a memory, the H-register, which is capable of storing the largest expected impulse response amplitude and is able to position the impulse response so that it properly accounts for the propagation delay of the echo path. The total memory capacity may be defined as the product of the maximum magnitude of a signal word and the number of words in the memory. This value may be normalized to unity and considered as the area of the memory. The area of any impulse response stored in the memory may then be described as the sum of the absolute value of the words comprising the impulse response and it may be expressed as a fraction of the total memory area. The typical impulse response durations in the telephone system range from a few milliseconds to 15 milliseconds with most of the area contained in the initial portion of the impulse response. It is, therefore, apparent that as a number of words in the memory increases, the area of a given typical impulse response becomes a smaller fraction of the total memory capacity. This also means that the number of unused words, that is, those words in the memory not containing active parts of the impulse response, increases. These unused words would ideally be zero, but in a working system some level may build up due to doubletalk, hum, signalling tones, high level uncorrelated near end noise, and other sources. This build-up may become severe enough to degrade the performance of the canceller to unacceptable levels of cancellation. When this occurs, the memory containing the impulse response should be cleared and a new impulse response model generated.

This invention proceeds from the recognition that system operation is enhanced by generating a new model from an all zero contents H-register rather than reconstruct or rework the impulse response model from inadvertently stored levels of accumulated noise data. The automatic H-register clear of this invention utilizes data as it arrives at the accumulator which consists of an adder and a latch. The sum of the magnitude of the words in the H-register is determined. This sum is stored in a second latch and applied to a comparator to determine if it exceeds some fixed predetermined threshold level. The threshold level is determined by an algorithm which models the amplitude and duration within which most impulse responses are encountered in the telephone system. The result of the comparison is then passed through a gate which is controlled by a timing signal which synchronizes the clearing signal with the occurrence of the internal housekeeping cycle of the echo canceller.

Accordingly, it is an object of this invention to provide an automatic H-register clearing for the prevention of erroneous convolution in a digital adaptive echo canceller.

It is a second object of this invention to provide an H-register apparatus which minimizes audible echo in long line communications systems.

It is a further object of this invention to provide an automatic clear function to an operating echo canceller.

Still another object of this invention is the method of recognizing that the H-register in an echo canceller may contain enough incorrect information to degrade performance and a system is provided for the clearing of the contents of that register in a minimum time.

These and other objects of this invention will be appreciated from a brief description of the drawings and description of the preferred embodiment which follows.

DETAILED DESCRIPTION OF THE PREFERRED EMBODIMENTS

Figure 1:
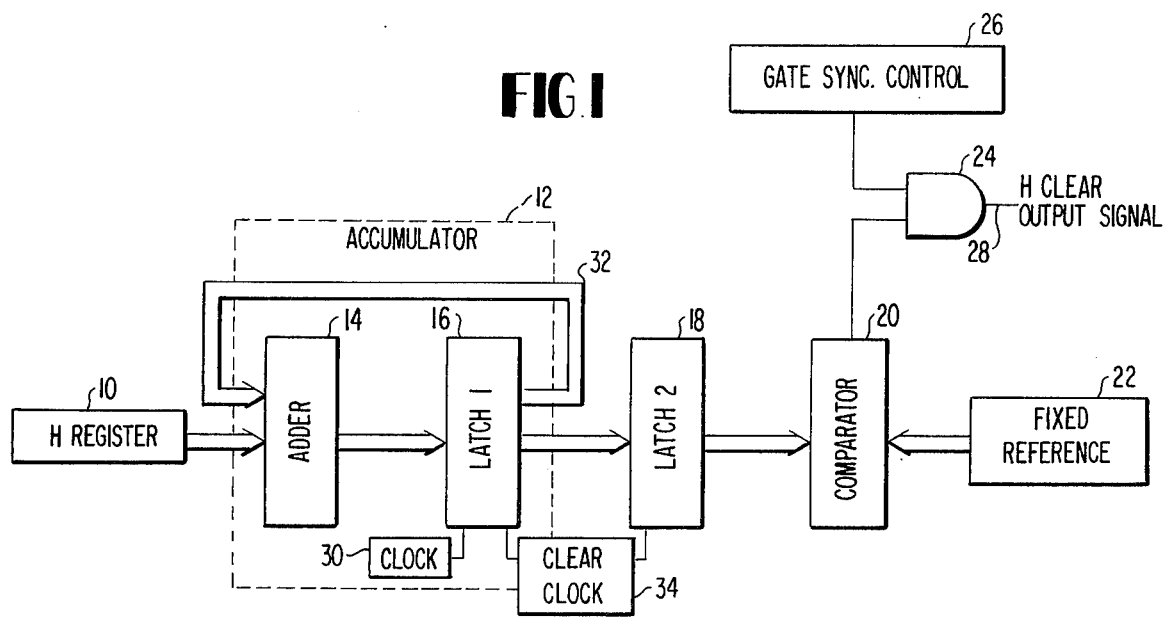
FIG. 1 is a block diagram of the automatic H-register clearing apparatus of the present invention.

Referring now to FIG. 1, a descriptive block diagram of a first preferred embodiment of the automatic H-register clear device is shown. Data from the H-register 10 arrives at an accumulator shown in dotted line 12 which consists of an adder 14 and a first latch 16. The sum of the magnitude of the words in the H-register is determined and this sum is stored in a second latch 18. The sum of the magnitude of the words in the H-register as stored in latch 18 is fed to a comparator 20 to determine if this magnitude exceeds some fixed predetermined threshold. For this purpose, a fixed reference is supplied to the comparator 20 by storage means 22 containing the reference signal. The output result from the comparator, indicating whether or not the fixed reference has been exceeded is fed to a gate 24 which is controlled by a timing signal 26. The timing signal 26 synchronizes the clearing signal shown schematically as 28 with the occurrence of the internal housekeeping cycle of the echo canceller. Signal 28 is fed back to H-register 10 to clear the memory. By this technique, when the value of the area in the H-register dedicated to unused words builds up to an unacceptably high level, thereby resulting in degrading the performance of the canceller, the H-register containing the impulse response is cleared and a new response generated.

The accumulator 12 determines the sum of the magnitude of the words in the H-register by performing an iterative function utilizing a clock 30 to determine the number of iterative loops along feedback path 32. A clear clock 34 is utilized to reset the latches 16 and 18 at the time that the impulse response is cleared and a new impulse response is generated in the H-memory. In addition, latch 16 must also be cleared at the recirculation period of the H-register, even if the fixed reference is not exceeded.

Figure 2:
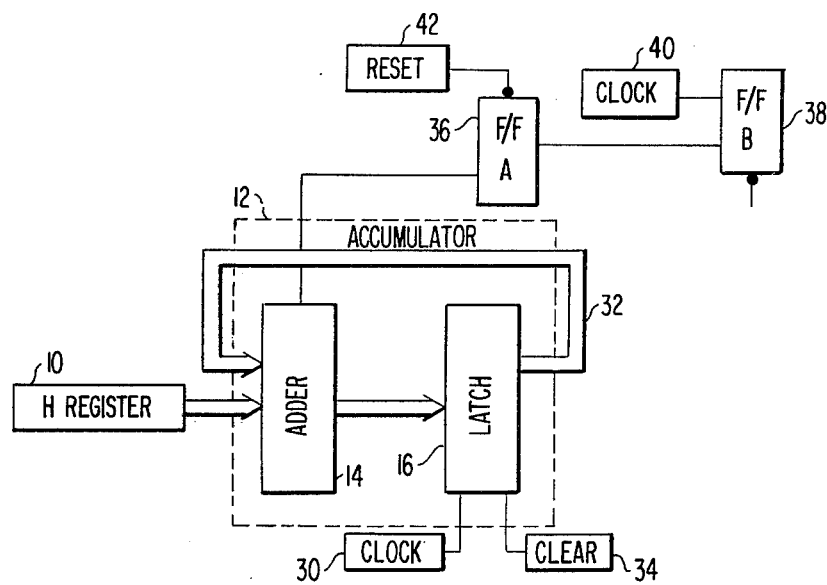
FIG. 2 is a block diagram of a second preferred embodiment of the automatic H-register clear design of the present invention.

Referring now to FIG. 2, a modification of the device of FIG. 1 is shown. As in the FIG. 1 device, H-register data from register 10 arrives at the input of adder 14 in a suitable digital format. The sum of the magnitudes is accumulated by means of the iterative loop 12 comprising adder 14, latch 16, and feedback loop 32. The first occurrence of an active state on the carry output of the adder 14 sets the flip-flop 36. The setting of flip-flop 36 is an unsynchronized event occurring when the adder reaches a maximum value, and, accordingly, its occurrence is not predictable. The output of flip-flop 36 is provided as an input to a second flip-flop device 38 which is properly synchronized by means of a clock signal emanating from clock 40. By this implementation, of a flip-flop 36, a replacement for the latch 2 (18) and the comparator 20 of the FIG. 1 embodiment are accomplished. Resetting of the flip-flop is by means of a conventional reset device 42 and the latch 16 is similarly synchronized and cleared by clock 30 and clear mechanism 34 in a manner consistent with the FIG. 1 embodiment. In a typical situation when the memory is provided with 32 microseconds of storage, the reference threshold used is approximately 12% of the memory area. The adder inputs were then bits $2^3$ through $2^8$ of the H-register words and the memory consisted of 263 11-bit words. The total memory capacity is then 263 × 1023. The accumulator performed the following summation:

$$\sum_{i=1}^{263} |h_i|, \text{ where } 2^3 \leq |h_i| < 2^9$$

and the threshold for clearing the H-register was set for, $$\sum_{i=1}^{263} |h_i| \geq 2^{15}$$

The truncated H-word input signal was used to reduce the physical size of the accumulator.

Figure 3:
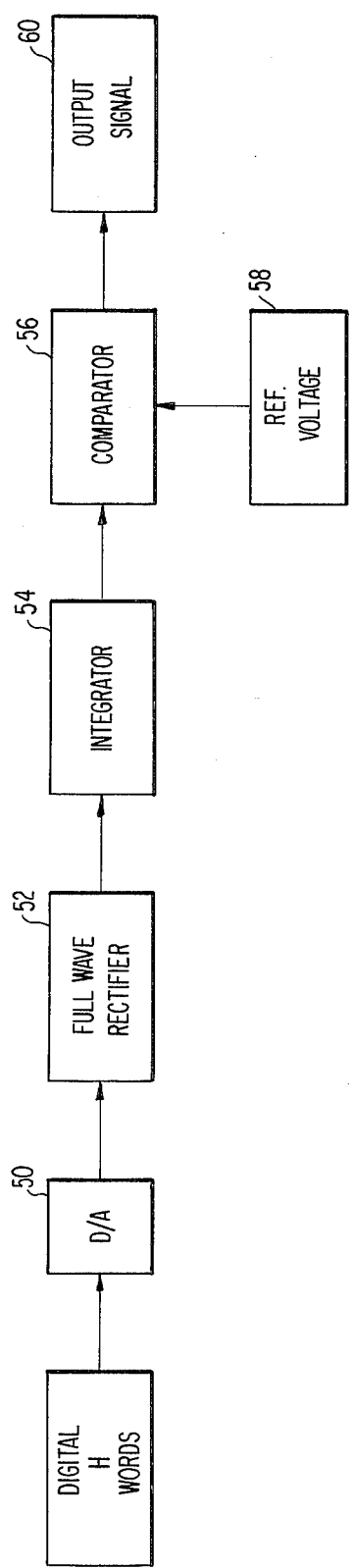
FIG. 3 is a block diagram of an analog implementation of an H-register clear mechanism.

Referring now to FIG. 3, an analog implementation of the instant invention is shown. The digital H-words are first transferred into the analog domain utilizing a digital-to-analog converter 50 and rectifier 52. The signal is then passed to an integrator 54 to perform the necessary summing operation. The summed signal is then fed to a comparator 56 which compares this signal with a reference voltage supplied by means 58. The analog comparator is then used to determine when the reference threshold is reached and to provide the automatic clear control signal as an output shown at 60. It is appreciated that if the H-words are already in an analog form, the D/A converter may be eliminated.

Figure 4:
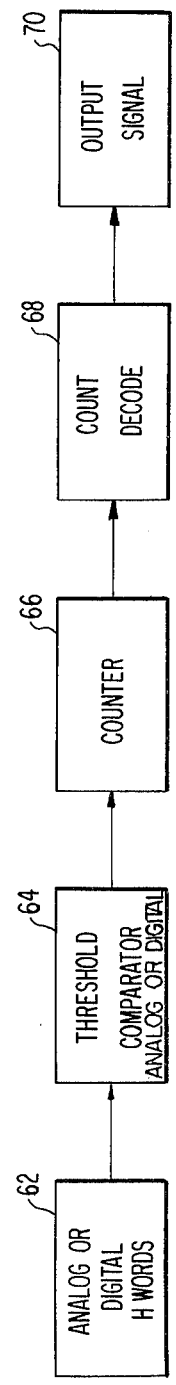
FIG. 4 is a block diagram of a second alternative preferred method of generating the automatic H-register clear utilizing the counter detection system.

Also, referring now to FIG. 4, another system of generating the automatic H-register clear is shown. In this embodiment, each word in the H-register is compared to a threshold value. The words, inputs from 62 are fed into threshold comparator 64, and if the value of the threshold is exceeded, a counter 66 is stepped one unit. If the number of words exceeding the threshold is equal to or greater than a predetermined count, as denoted by the value in the counter 66, a count decoder 68 generates an output signal 70 to automatically clear the H-register. The predetermined limit of words exceeding the threshold value is determined from a study of impulse response patterns. It is apparent that this system involves setting two parameters, the amplitude threshold and the number of words criteria. However, either analog or digital implementation could be used.

While exemplary embodiments of the invention have been described, the true scope of the invention is to be determined from the claims.

What is claimed is:

1. A circuit for generating an automatic H-register clear signal for adaptive echo cancellers comprising:
   an accumulator receiving data from the H-register and determining the magnitude of words in the H-register;
   comparator means receiving the output of said accumulator amd determining whether said output exceeds a fixed, predetermined value; and
   means synchronized with the housekeeping cycles of said echo canceller to transmit a clearing signal to said H-register with the occurrence of the internal housekeeping cycle of said canceller when said predetermined value is exceeded.

2. The apparatus of claim 1 wherein said accumulator includes an adder and a storage means, said adder adding the accumulated sum stored in the said storage means with the incremental word input from the H register to determine the total number of words in the H-register.

3. The apparatus of claim 2 wherein said comparator means comprises a comparator having a first input of the output of said accumulator and second input of a fixed reference signal.

4. The apparatus of claim 2 wherein said comparator comprises a flip-flop set with the accumulation of a value exceeding an initial bias value tending to keep the flip-flop closed.

5. The apparatus of claim 1, wherein said accumulator comprises a digital-to-analog converter for converting the digital H-words into analog form, a full wave rectifier coupled to the digital-to-analog converter and an integrator coupled to the output of said full wave rectifier.

6. A method of generating an automatic H-register clear signal for an adaptive echo canceller comprising the steps of:

comparing each word in the H-register to a predetermined threshold value;
generating an output signal each time said threshold is exceeded, said output signal stepping a counter by one unit;
comparing the number stored in the counter, which is indicative of the number of words exceeding the threshold, with a predetermined maximum number of words, said predetermined maximum number being based on a determination derived from echo canceller impulse response patterns; and
generating an output signal to clear the H-register when the predetermined maximum number of words is exceeded.

7. The method of claim 6 wherein said step of comparing each word in the H-register to a predetermined threshold is accomplished in an analog mode.

8. The method of claim 6 wherein said step of comparing each word in the H-register to a predetermined threshold is accomplished in a digital mode.

* * * * *

UNITED STATES PATENT AND TRADEMARK OFFICE
CERTIFICATE OF CORRECTION

PATENT NO. : 4,021,623
DATED : May 3, 1977
INVENTOR(S) : Henri G. SUYDERHOUD et al It is certified that error appears in the above-identified patent and that said Letters Patent are hereby corrected as shown below:

Column 1, line 9, delete "principal" and insert --principle--.

Column 3, line 37, delete "notica-" and insert -- noticea- --.

Column 5, line 55, delete " $h_1$ " and insert -- $h_i$ --.

Column 6, line 49, delete "H" and insert -- H- --.

Signed and Sealed this twenty-third Day of August 1977

[SEAL]

Attest:

RUTH C. MASON
*Attesting Officer*

C. MARSHALL DANN
*Commissioner of Patents and Trademarks*